(12) United States Patent
Takizawa (10) Patent No.: US 7,353,751 B2
(45) Date of Patent: Apr. 8, 2008

(54) COFFEEMAKER

(75) Inventor: Hiroyuki Takizawa, Matsumoto (JP)

(73) Assignee: Izumi Products Company, Nagano (JP)

( * ) Notice: Subject to any disclaimer, the term of this patent is extended or adjusted under 35 U.S.C. 154(b) by 508 days.

(21) Appl. No.: 10/985,371

(22) Filed: Nov. 10, 2004

(65) Prior Publication Data

US 2005/0103203 A1    May 19, 2005

(30) Foreign Application Priority Data

Nov. 13, 2003  (JP)  ............... 2003-383584

(51) Int. Cl.
*A47J 31/00*  (2006.01)
(52) U.S. Cl. ............... 99/287; 99/290; 99/306
(58) Field of Classification Search ............ 99/290, 99/287, 299, 300, 304, 306, 307, 316; 366/54, 366/63, 147, 220, 178.1, 180.1
See application file for complete search history.

(56) References Cited

U.S. PATENT DOCUMENTS 4,508,023 A * 4/1985 Naya et al. ............ 99/279

5,235,902 A    8/1993 Ogawa et al.
5,340,597 A * 8/1994 Gilbert ............... 426/433
5,957,035 A * 9/1999 Richter ............... 99/287

FOREIGN PATENT DOCUMENTS

| JP | 59-7732 | 1/1984 |
|---|---|---|
| JP | 61-179115 | 8/1986 |
| JP | 4-121835 | 10/1992 |
| JP | 2000-184966 | 7/2000 |
| JP | 2000-300438 | 10/2000 |
| JP | 2002-199987 | 7/2002 |

* cited by examiner

*Primary Examiner*—Reginald L. Alexander
(74) *Attorney, Agent, or Firm*—William L. Androlia; H. Henry Koda (57) ABSTRACT

A coffeemaker that heats up water in water tanks and supplies the heated water into a coffee funnel that has ground coffee and further collects liquid coffee dripping from the coffee funnel; the coffeemaker including an iced coffee tank, which collects the liquid coffee that drips from the coffee funnel, and an ice water tank, which accommodates the iced coffee tank and contains ice water that cools the liquid coffee inside the iced coffee tank via the walls of the iced coffee tank; and a relative difference in rotational speed being given to the iced coffee tank and the ice water inside the ice water tank.

13 Claims, 6 Drawing Sheets

COFFEEMAKER

BACKGROUND OF THE INVENTION

1. Field of the Invention

The present invention relates to a coffeemaker that makes iced coffee using ground coffee.

2. Prior Art

Generally two types of coffeemakers are known. One is a drip type and the other is a paper filter type. In such coffeemakers, coffee is extracted by pouring high temperature hot water into a coffee funnel that has ground coffee therein, and the liquid (extracted) coffee that drips from this coffee funnel is collected.

In the coffeemakers disclosed in Japanese Patent Application Laid-Open (Kokai) No. 61-179115 and Japanese Utility Model Application Laid-Open (Kokai) No. 59-7732, high-temperature hot water obtained by way of heating water in a water tank by a heater is poured into a chamber (coffee funnel) that contains ground coffee, and high-temperature liquid coffee that drips from this chamber passes through an ice chamber that contains ice, and cooled liquid coffee is collected in a decanter that is set beneath this ice chamber. In short, in these coffeemakers, high-temperature liquid coffee is cooled by pouring it into ice.

In the coffeemaker disclosed in Japanese Patent Application Laid-Open (Kokai) No. 2000-184966, high-temperature liquid coffee that drips from a chamber (coffee funnel) is conducted either directly into a pot or into a coffee cooling device via a conduit, and the coffee is cooled in this coffee cooling device. In regard to this coffee cooling device, this prior art merely describes that the cooling device is the one conventionally used, and no description of the internal structure of the coffee cooling device is described.

The coffeemaker disclosed in Japanese Utility Model Application laid-Open (Kokai) No. 04-121835 causes high-temperature liquid coffee to drop into a container, conducts the high-temperature liquid coffee into a separate receiving tank by means of a conduit (a hot beverage extraction means), and cools this receiving tank by a refrigerating device.

Japanese Patent Application Laid-Open (Kokai) No. 2002-199987 discloses a water-discharge type coffee extraction device. In this extraction device, melt water that drips from an ice container is caused to drip into a filter that contains ground coffee, and coffee is extracted over a long period of time.

In the coffeemakers described in Japanese Patent Application Laid-Open (Kokai) No. 61-179115 and Japanese Utility Model Application Laid-Open (Kokai) No. 59-7732, high-temperature liquid coffee is cooled when it comes into direct contact with ice. In other words, the cooled liquid coffee is diluted by the water that is melted from the ice. Accordingly, the flavor of the iced coffee deteriorates, and the problem is that the taste and smell of the ice is transferred to the liquid coffee.

The structure of the coffee cooling device in Japanese Patent Application Laid-Open (Kokai) No. 2000-184966 is unclear; however, if in this structure the liquid coffee is poured into ice that is placed in the coffee cooling device beforehand, then the coffee will be diluted by the melt water from the ice. Thus, problems similar to those of Japanese Patent Application Laid-Open (Kokai) No. 61-179115 and Japanese Utility Model Application Laid-Open (Kokai) No. 59-7732 arise.

The coffeemaker described in Japanese Patent Application Laid-Open (Kokai) No. 2000-184966 contains a refrigerating device, and thus it requires a compressor, etc. As a result, the coffeemaker is complex in structure and large in size; and it is considered that this coffeemaker is for commercial use and is not suitable for general household use.

The device described in Japanese Patent Application Laid-Open (Kokai) No. 2002-199987 extracts coffee using ice water. The extraction time is conspicuously longer than in the case in which liquid coffee is cooled after being extracted with hot water, and the taste is also completely different.

SUMMARY OF THE INVENTION

The present invention was devised in light of such facts; the object of the present invention is to provide a coffeemaker suitable for home use, in which delicious iced coffee that is rich in flavor can be prepared easily without being diluted by melt water from ice, and which further has a simple structure and small in size.

The above object is accomplished by a unique structure for a coffeemaker that heats water accommodated in a water tank, conducts heated water into a coffee funnel that accommodates ground coffee, and collects liquid coffee that drips from the coffee funnel; and in the present invention, the coffeemaker comprises:

- an iced coffee tank that collects liquid coffee dripping from the coffee funnel,
- an ice water tank that accommodates ice water which cools the liquid coffee inside the iced coffee tank via walls of the iced coffee tank, and
- a driving means that provides a relative difference in rotational speed between the iced coffee tank and the ice water inside the ice water tank.

In the above structure, the high-temperature liquid coffee that drips from the coffee funnel enters the iced coffee tank. The liquid coffee inside this iced coffee tank is cooled by the ice water inside the ice water tank via the walls of the iced coffee tank. In other words, the iced coffee tank is inside ice water. Here, at least one of the tanks, i.e., either the iced coffee tank or the ice water tank, is rotated so that a relative difference in rotational speed is created between the two tanks, so that the liquid coffee inside the iced coffee tank is cooled with good efficiency via the walls of the iced coffee tank.

Thus, since the liquid coffee and ice water are separately accommodated with the walls of the iced coffee tank interposed between the two liquids, the liquid coffee is not diluted by melt water from the ice; and no deterioration in the flavor of the iced coffee occurs, and iced coffee with a good taste can be prepared in a simple manner. Furthermore, since cooling is accomplished by means of ice using a coffee funnel of the conventional drip type or paper filter type, etc., there is no need for a refrigerating apparatus, etc. Accordingly, the structure of the coffeemaker is simple, its size is small, and the coffeemaker is suitable for home use.

In the present invention, one of two tanks, i.e., either the iced coffee tank or the ice water tank, is anchored to the coffee funnel or main body side, while the other tank can be driven by a motor. For instance, such a structure can be employed that the iced coffee tank is provided in its entirety within the ice water tank, these tanks are rotated relatively and coaxially, and a liquid coffee discharge valve is provided in the lower end of the iced coffee tank. The iced coffee tank can be immersed in the ice water tank from above, so that it is inserted into and taken out of the ice water tank at its upper end.

Three accommodating sections, i.e., upper, middle and lower accommodating sections, are disposed in the main body of the coffeemaker, and the coffee funnel is placed or set in the upper and middle accommodating sections. This structure allows extraction of iced coffee and hot coffee to be easily handled.

For instance, when iced coffee is to be extracted, the coffee funnel is set in the upper accommodating section, and a coffee cooling device in which an iced coffee tank and an ice water tank are formed as an integral unit is set in the middle accommodating section; and after the extraction of the iced coffee, a jug is set in the lower accommodating section and the discharge valve of the iced coffee tank is opened, so that the iced coffee in the iced coffee tank flows downward into the jug. In this case, the operation can be simplified by a system in which the discharge valve opens in linkage with the operation of inserting the jug into the lower accommodating section.

When hot coffee is to be extracted, the coffee funnel is set in the middle accommodating section, a jug is set in the lower accommodating section, a scatter is set in the upper accommodating section, and the heated or hot water that is poured into the coffee funnel is dispersed and caused to drip into the coffee funnel. In this case, since hot water is poured into the coffee funnel while being scattered, hot water is not concentrated in one portion of the ground coffee.

Two water tanks, i.e., a larger water tank (or a first water tank) and a smaller water tank (or a second tank), in which the smaller water tank has substantially the same volume as the iced coffee tank, can be employed so that the smaller water tank is used for the extraction of iced coffee. With the use of such a smaller water tank, the iced coffee will not overflow from the iced coffee tank during extraction.

When such two types of water tanks, i.e., a larger water tank and a smaller water tank, are provided, it is preferable that the water pipe that is connected to the smaller water tank be smaller in diameter than the water pipe connected to the larger water tank. With this pipe having a smaller diameter, the flow velocity of the water is lowered, the extraction speed of the coffee is slowed, and it is possible to obtain a thicker coffee liquid. Thus, excessive dilution of the coffee can be prevented even if ice is placed in the coffee.

In cases where the present invention is applied to a coffeemaker in which the temperature is maintained by placing a jug of hot coffee on top of a heater installed in the coffeemaker, it is desirable to set an adiabatic material at the bottom of the jug during the extraction of iced coffee. Furthermore, it can be possible to form the pipe of the smaller water tank with a smaller diameter and to switch the amount of heat generated by the heater so that this amount of heat increases when hot coffee is extracted and decreases when iced coffee is extracted.

It is also possible to use a structure in which the driving means includes two driving bodies, which face the middle accommodating section and upper accommodating section, and a motor, which causes these rotating bodies to rotate, so that one driving main body rotates the ice water tank of the coffee cooling device that is placed in the middle accommodating section when iced coffee is extracted, and the other driving main body rotates the scatter that is placed in the upper accommodating section when hot coffee is extracted. The driving bodies can be constructed from gears, friction rings, etc.

Instead of causing the ice water tank or iced coffee tank to rotate, the driving means can rotate the ice water inside the ice water tank relative to the iced coffee tank. For example, the iced coffee tank and ice water tank can be formed in coaxial cylindrical shapes that have a bottom and held in the main body, while an agitating member (such as an agitating rod, agitating vanes, etc.) extending into the ice water tank from above is rotated by a motor.

The agitating member can be directly rotated by a motor or be fastened to some other rotating member. For example, the coffee funnel can be held so that this coffee funnel is rotated about the vertical axis, thus making it possible to rotate this coffee funnel by means of the motor, while the agitating member is fastened to the undersurface of the coffee funnel.

In the above structure, it becomes necessary to install and remove the coffee funnel and coffee cooling device with respect to the main body in a state in which the agitating member that is an integral unit with the coffee funnel is inserted in the ice water tank. Accordingly, the coffee funnel needs to be detachable and rotationally drivable with respect to the main body side. This can be made possible by a structure in which a funnel holding plate is installed in the main body above the coffee funnel so that the funnel holding plate is rotatable by the motor, and the coffee funnel is made detachable from beneath the funnel holding plate by inserting the coffee funnel beneath the funnel holding plate in a state in which the agitating member that is integral unit with the coffee funnel is inserted in the ice water tank and the coffee funnel is placed on the coffee cooling device and by lifting the coffee cooling device.

DETAILED DESCRIPTION OF THE INVENTION

Figure 1:
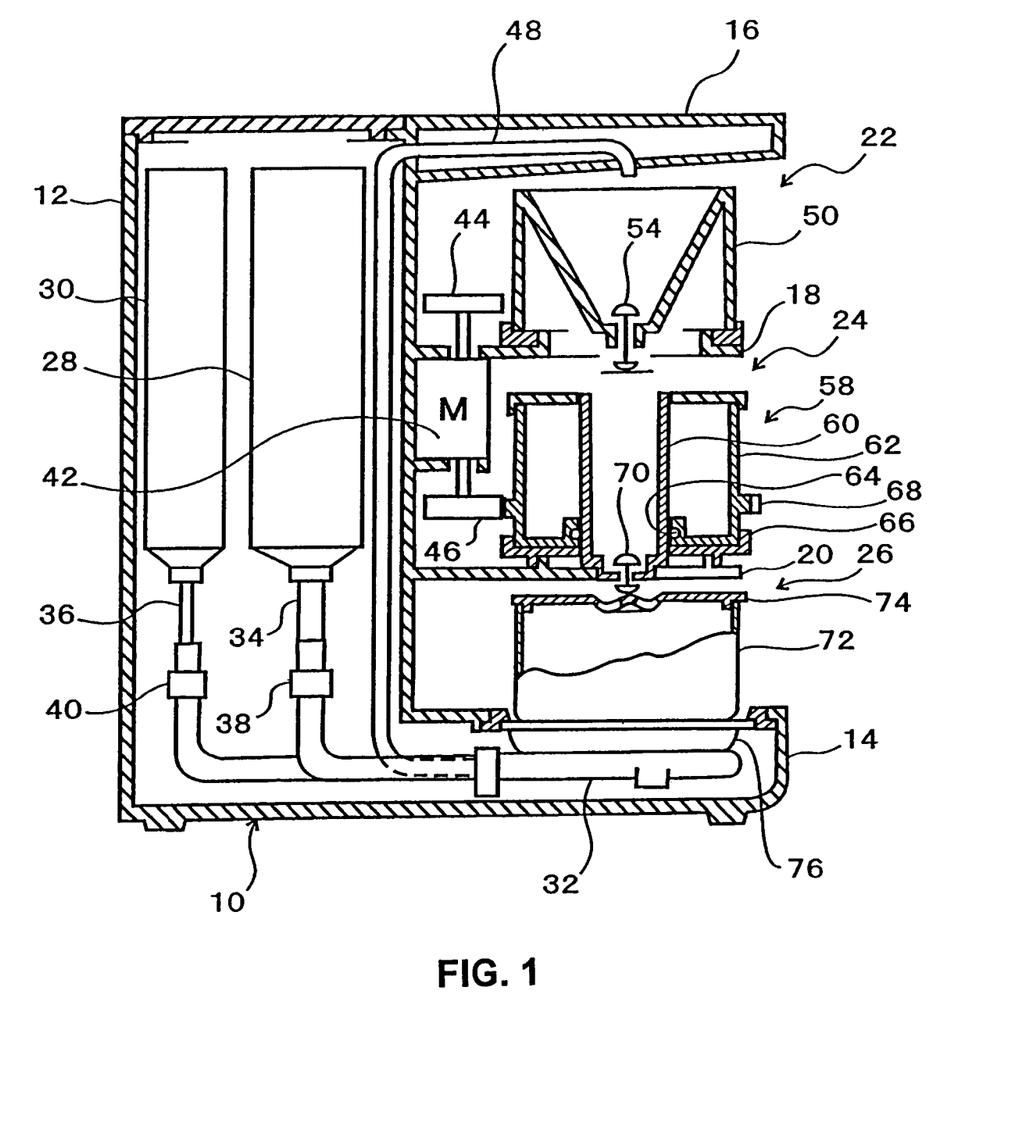
FIG. 1 shows, in cross section, the coffeemaker according to one embodiment of the present invention, the coffeemaker being in an iced coffee extraction process.
Figure 2:
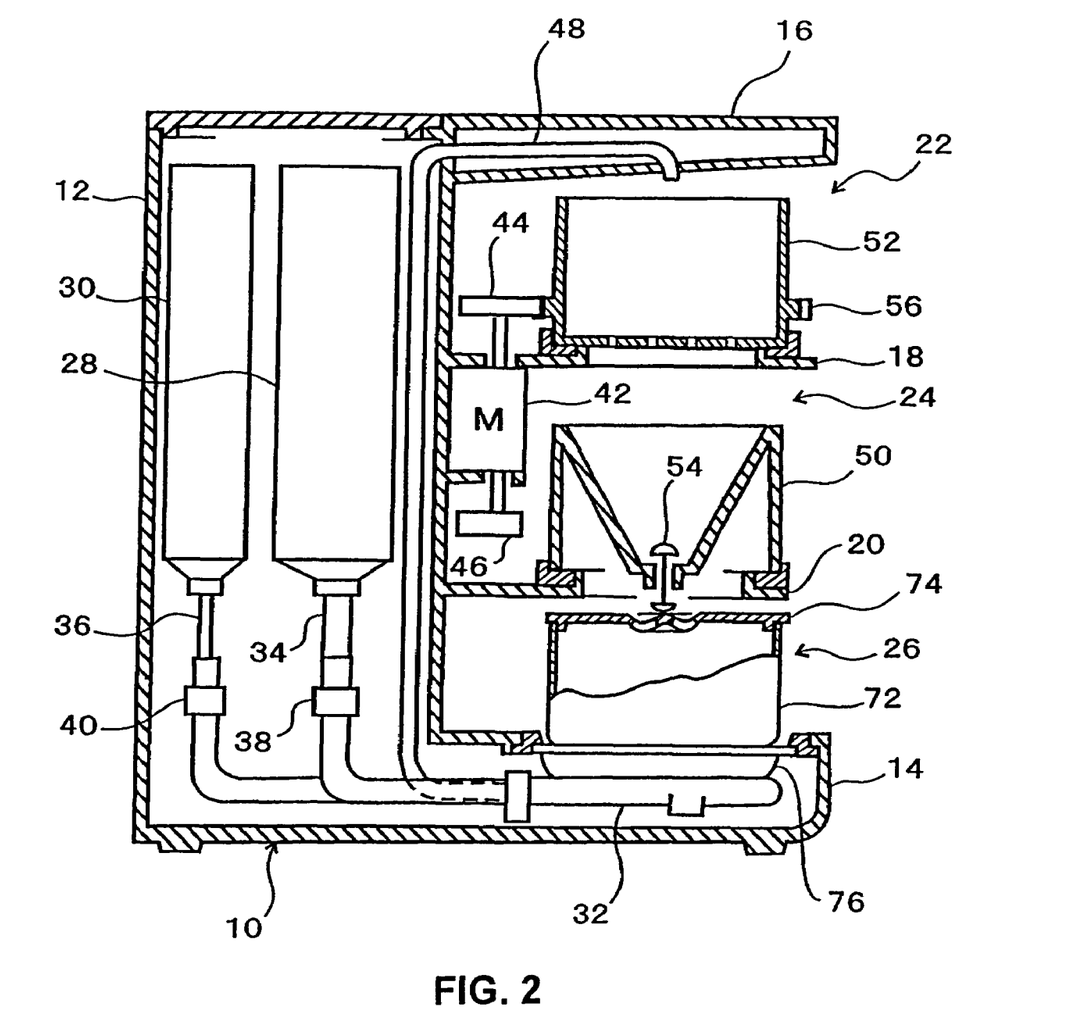
FIG. 2 shows, in cross section, the embodiment in a hot coffee extraction process.

In FIGS. 1 and 2, the reference numeral 10 indicates a main body of the coffeemaker. The coffeemaker main body 10 includes a water tank accommodating section 12, a bottom section 14, an upper wall section 16, and partition walls 18 and 20 that partition the space between the bottom section 14 and the upper wall section 16. The partition walls 18 and 20 partition the space between the bottom section 14 and upper wall section 16 into three accommodating sections, i.e., upper, middle and lower accommodating sections 22, 24 and 26.

Two types of water tanks 28 and 30 with different volumes, i.e., larger and smaller, are accommodated inside the water tank accommodating section 12. A heater 32 is provided in the bottom section 14, and water is selectively supplied to this heater 32 from either the larger (first) water tank 28 or the smaller (second) water tank 30. Electromagnetic valves 38 and 40 are provided on pipes 34 and 36 that conduct water to the heater 32 from the water tanks 28 and 30. The valves 38 and 40 can be selectively opened and closed by a switch 82 described below. One-way valves (not shown in the drawings) that prevent the back-flow of water into the tanks 28 and 30 are built in the electromagnetic valves 38 and 40.

A motor 42 is installed on the water tank accommodating section 12 side in the vicinity of the middle accommodating section 24. A speed reduction gear is provided in the motor 42. An output shaft of the motor 42 extends into the upper accommodating section 22 and middle accommodating section 24, and an upper or first gear 44 and a lower or second 46 that together constitute driving members are attached to both (upper and lower) extending ends of the output shaft. The motor 42 and gears 44 and 46 form a driving means.

Heated water (hot water) that is heated by the heater 32 is conducted to the upper wall section 16 through a pipe 48 and is caused to drip into the coffee funnel 50 (FIG. 1) or scatter 52 (FIG. 2) accommodated in the upper accommodating chamber 22. The coffee funnel 50 performs coffee extraction by allowing the heated water to pass through the ground coffee accommodated in the coffee funnel 50; and for iced coffee extraction, the coffee funnel 50 is placed or set on the upper partition wall 18.

A valve 54 that functions as a dripping stopper is provided in the bottom of the coffee funnel 50. Ordinarily, the valve 54 is closed by the weight of the valve 54 itself or by a coil spring (not shown in the drawings), so that undesired dripping of the liquid coffee is prevented; and the valve 54 is opened in linkage with the placement or setting of a coffee cooling device 58 (described below) in the middle accommodating section 24, so that the extracted liquid coffee is discharged into an iced coffee tank 60 described below.

As shown in FIG. 2, the scatter 52 is set in the upper accommodating section 22 during hot coffee extraction and disperses the heated or hot water that is poured into the coffee funnel 50 that is set in the middle accommodating section 24. A circumferential gear 56 that engages with the gear 44 is formed on the outer circumference of the scatter 52, and the scatter 52 is rotationally driven by the motor 42.

During the extraction of iced coffee, the coffee cooling device 58 is placed in the middle accommodating section 24. The coffee cooling device 58 comprises an iced coffee tank 60 and an ice water tank 62 that surrounds the outer circumference of the iced coffee tank 60. The iced coffee tank 60 is provided inside the ice water tank 62, and the bottom of the iced coffee tank 60 passes through the partition wall 20 and faces the lower accommodating section 26. The bottom of the iced coffee tank 60 engages with this partition wall 20, so that rotation is restrained. The ice water inside the ice water tank 62 directly contacts the outer surface of the iced coffee tank 60 and thus efficiently cools the iced coffee tank 60.

A waterproof sealing member 64 is interposed between the outer surface of the iced coffee tank 60 and the sliding part of the ice water tank 62, and the leakage of ice water is thus prevented. The ice water tank 62 can be rotated on a tray 66 that is placed on the partition wall 20. A circumferential gear 68 that engages with the gear 46 is formed on the outer circumference of the ice water tank 62, and the ice water tank 62 is rotationally driven by the motor 42.

A discharge value 70 that constitutes a dripping stopper is provided in the bottom of the iced coffee tank 60. Ordinarily, the discharge valve 70 is closed by the weight of the discharge valve 70 itself or by a coil spring (not shown in the drawings), so that undesired dripping of the liquid coffee that has accumulated inside the iced coffee tank 60 is prevented; and this valve 70 opens in linkage with the placement of a jug 72 in the lower accommodating section 26.

The jug 72 is a vessel in which the liquid coffee is accumulated; and it has a handle and a pouring spout (neither of which is shown in the drawings) as well as a cover 74. A projection, which pushes open the discharge valve 70 of the iced coffee tank 60, and an opening that surrounds this projection, are formed in the cover 74. The projection of the cover 74 pushes the valve 70 upward (and thus opens the valve 70) when the jug 72 is placed in the lower accommodating section 26. As a result, the iced coffee that has accumulated inside the iced coffee tank 60 and that has been chilled by the ice water tank 62 flows downward into the jug 72.

During this iced coffee extraction, the electromagnetic valve 40 opens so that water in the smaller water tank 30 flows into the heater 32. Since the pipe 36 of the smaller water tank 30 has a small diameter, the quantity of heated water that drips into the coffee funnel 50 is small. Accordingly, the time required for the extraction of the coffee by the coffee funnel 50 is long, and the coffee that accumulates in the iced coffee tank 60 becomes thicker. Since iced coffee is generally drunk with ice put in the cup, the ice melts so that the coffee is diluted. In the shown embodiment, since the coffee that accumulates in the iced coffee tank 60 is sufficiently thick, no excessive dilution of the coffee would occur when the coffee is drunk with ice put therein. Accordingly, coffee can keep good taste to the end.

It is preferable to provide an adiabatic plate 76 between the bottom of the jug 72 and the heater 32. The adiabatic plate 76 is used in order to prevent the iced coffee from being heated by the heat of the heater 32 when the iced coffee is collected in the jug 72. When extracting hot coffee, as will be described below, it is naturally desirable to maintain the temperature of the hot coffee high by the heat of the heater 32. Accordingly, the adiabatic plate 76 is removed, or it is replaced with a plate that has a good thermal conductivity.

Since the coffee cooling device 58 cools the iced coffee 60 by the relative movement of the iced coffee tank 60 and the ice water tank 62, it is desirable to promote the agitation of the ice water inside the ice water tank 62. Thus, projections or grooves, for instance may be formed in the outer surface of the iced coffee tank 60. It is desirable that the iced coffee tank 60 be constructed from a material that has a good thermal conductivity, e.g., a metal.

Next, hot coffee extraction will be described with reference to FIG. 2.

When hot coffee is extracted, as described above, the scatter 52 is set in the upper accommodating section 22, and the coffee funnel 50 is set in the middle accommodating section 24. The discharge valve 54 of the coffee funnel 50 is pushed upward and opened by the cover 74 of the jug 72 set in the lower accommodating section 26. The outer circumferential gear 56 of the scatter 52 is engaged with the driving gear 44 so that the scatter 52 is rotated by the motor 42 as described above.

During the hot coffee extraction, the electromagnetic valve 38 is opened, water from the larger water tank 28 is heated by the heater 32, and this heated or hot water is supplied or conducted to the scatter 52. Since the scatter 52 is rotating, heated water is uniformly scattered on the coffee funnel 50 from small holes in the bottom of the scatter 52. Accordingly, good-tasting hot coffee can be extracted.

Next, the electrical circuitry of the above-described coffeemaker will be described with reference to FIG. 3.

Figure 3:
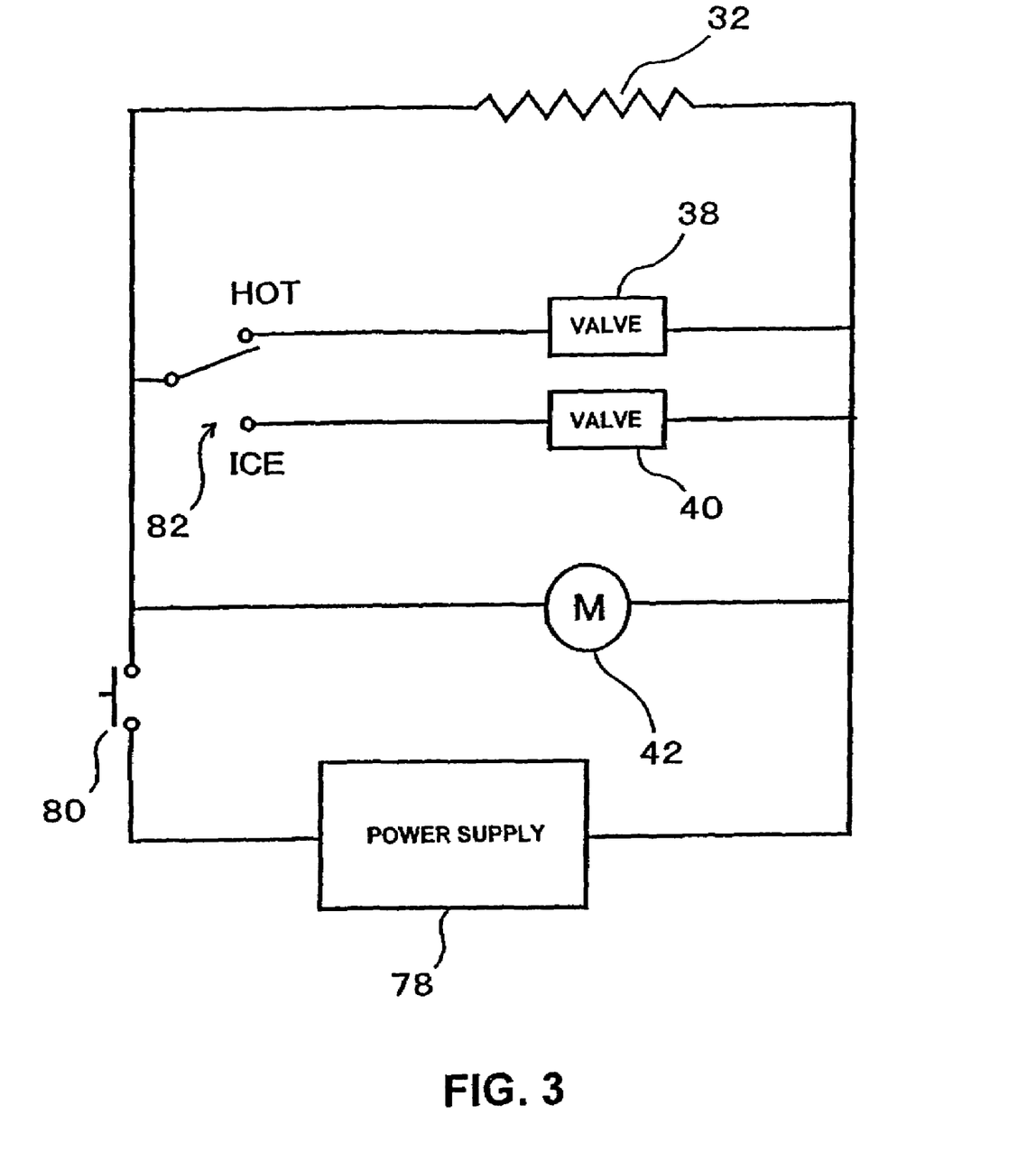
FIG. 3 is an electrical circuit diagram employed in the embodiment.

In FIG. 3, the reference numeral 78 indicates a power supply. The power supply rectifies and smoothes a commercial power supply so as to supply a direct current with a constant voltage. The reference numeral 80 is a main switch; and when this main switch 80 is turned on, the heater 32 generates heat, and the motor 42 is started. The reference numeral 82 is a change-over switch; and with the use of this switch 82, the positions of HOT and ICE are selected for the extraction of hot coffee and iced coffee, respectively. When HOT is selected, the electromagnetic valve 38 is opened, and water from the larger water tank 28 is used. When ICE is selected, the electromagnetic valve 40 is opened, and water from the smaller water tank 30 is used.

Figure 4:
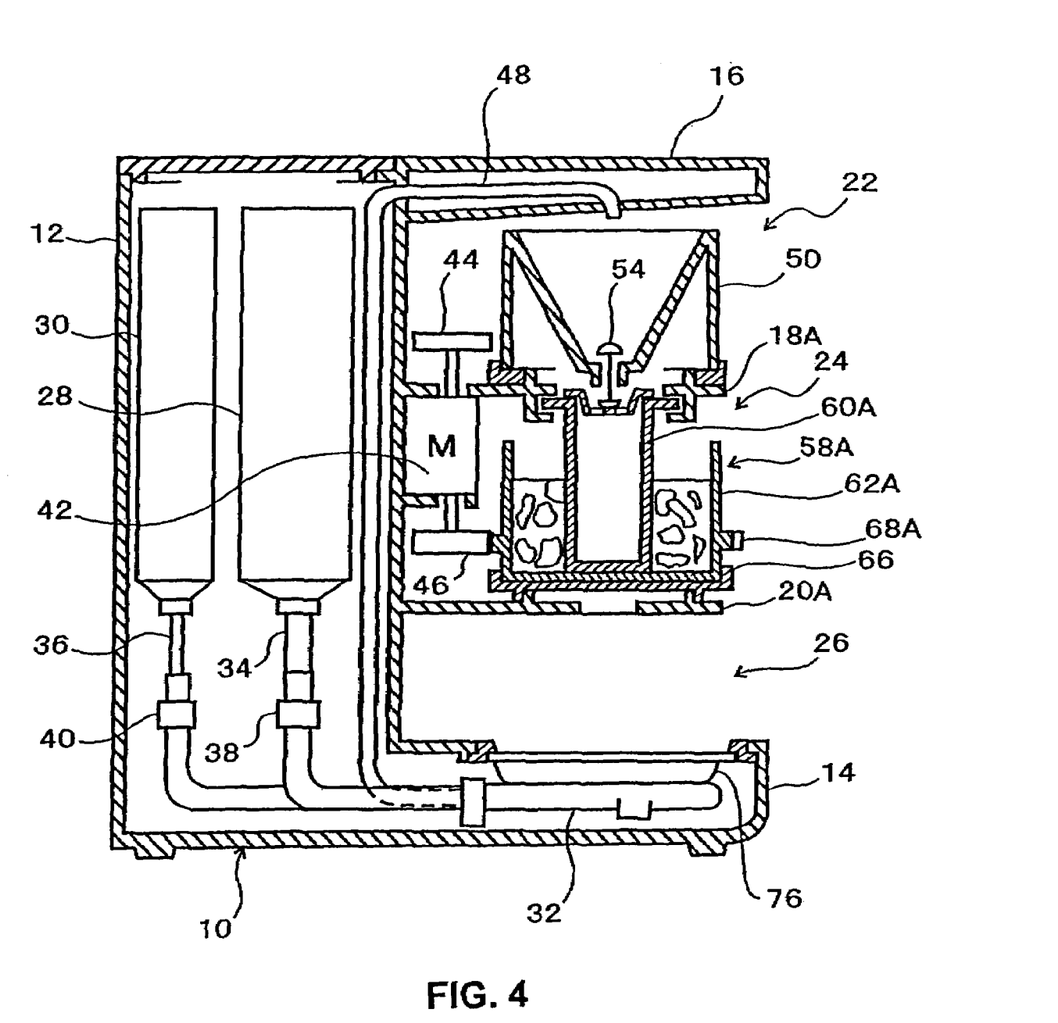
FIG. 4 shows, in cross section, the coffeemaker according to another embodiment of the present invention.

FIG. 4 shows another embodiment of the present invention. In the coffeemaker of this embodiment, the ice water tank 62A of the coffee cooling device 58A is formed in a cylindrical shape that has a bottom and is carried on the lower partition wall 20A so as to be rotatable; and the upper part of the iced coffee tank 60A is held by the main body 10A side while being immersed in the ice water tank 62A from above.

The ice water tank 62A has a circumferential gear 68A on its outer surface; and this gear, engaged with the driving gear 46, is rotationally driven. The iced coffee tank 60A is fastened to and suspended from the undersurface of the upper partition wall 18A. In this embodiment, the structure of the cooling device 58A is simplified. In FIG. 4, element that are the same as those in FIGS. 1 and 2 are indicated by the same reference numerals, and a description of such elements is not described.

Figure 5:
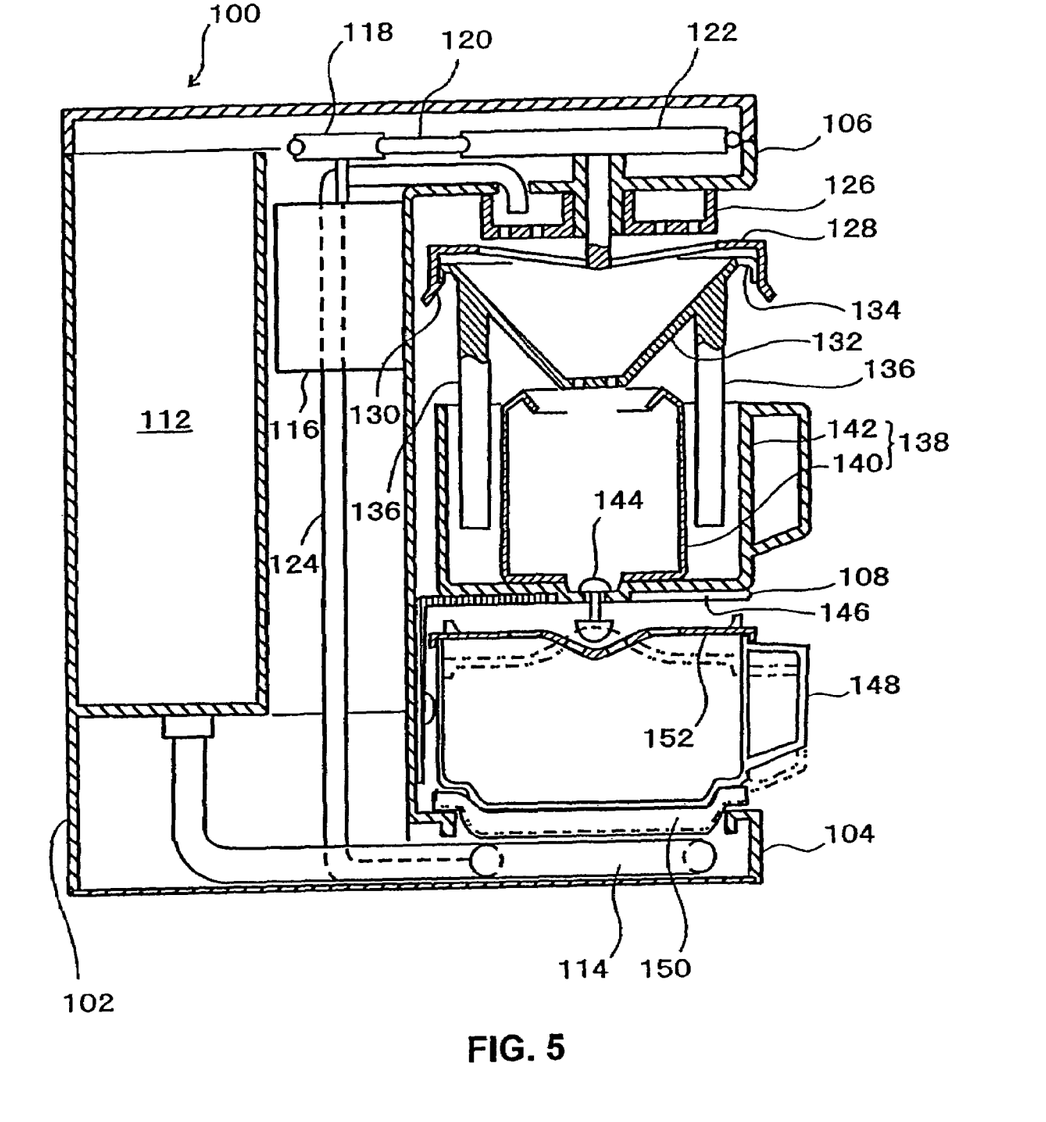
FIG. 5 shows, in cross section, the coffeemaker according to still another embodiment of the present invention.
Figure 6:
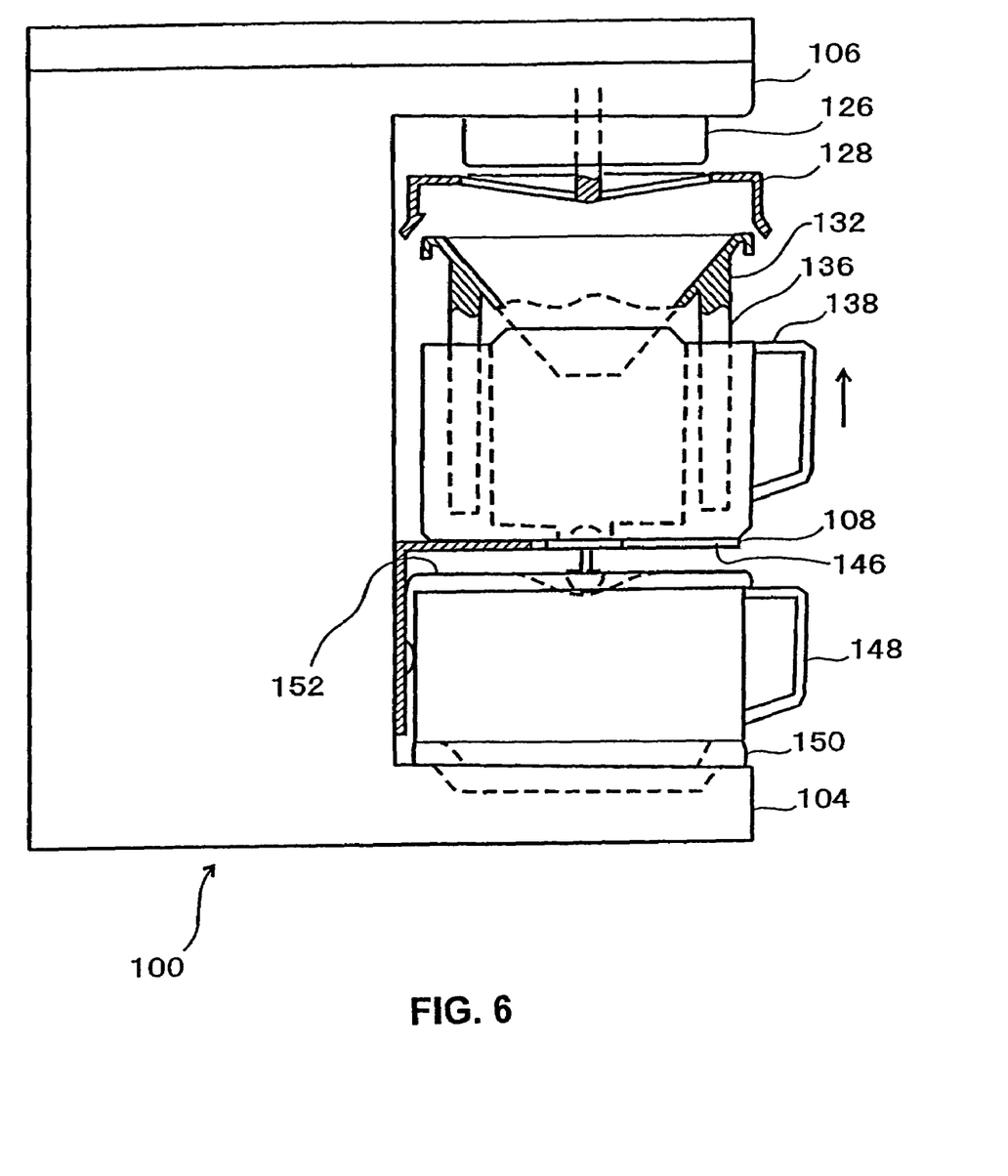
FIG. 6 is a diagram that shows the manner of attaching the coffee funnel to the funnel holding plate in the embodiment shown in FIG. 5.

FIG. 5 shows still another embodiment of the coffeemaker of the present invention, and FIG. 6 shows the manner of setting the coffee funnel in this embodiment. In FIG. 5, the reference numeral 100 indicates a main body, 102 is a water tank accommodating section, 104 a bottom section, 106 an upper wall section, and 108 a partition wall that partitions the space between the bottom section 104 and upper wall section 106 into upper and lower sections.

A water tank 112 is accommodated in the water tank accommodating section 102. Scales that indicate the amount of water for iced coffee extraction and the amount of water for hot coffee extraction are separately provide on this water tank 112. The water in the water tank 112 is supplied via a one-way valve (not shown in the drawings) to a heater 114 installed in the bottom section 104.

The reference numeral 116 is a motor that has therein a speed reduction gear. The rotation of the output shaft of this motor is transmitted via a small pulley 118 and belt 120 to a large pulley 122 that is in the upper wall section 106. This structure forms a part of the driving means described below.

The heated or hot water made by the heater 114 is conducted or supplied to the upper wall section 106 by a pipe 124 and is caused to drip into a scatter 126 that is held on the undersurface of the upper wall section 106. The scatter 126 has a substantially dish-form shape with numerous small holes and causes the heated water that leaves the pipe 124 to drip into the coffee funnel 132 (described below) while scattering the heated water.

The shaft of the large pulley 122 passes vertically through the center of the scatter 126, and a funnel holding plate 128 is fastened to the lower end of this shaft. The funnel holding plate 128 has a cylindrical shape, in which the portion near the center sinks slightly downward, and the circumferential edge opens outward at the bottom. Portions near the center and the circumferential edge portion are connected by radial ribs. Furthermore, a plurality of protrusions 130 are formed on the inner circumferential surface of the circumferential edge portion of the funnel holding plate 128 at appropriate intervals in the circumferential direction. The coffee funnel 132 is anchored to and released from these protrusions 130.

The outer-circumferential diameter of the upper opening of the coffee funnel 132 is slightly smaller than the inner-circumferential diameter of the circumferential edge portion of the funnel holding plate 128. A plurality of cut-outs 134 are formed in this outer circumference at appropriate intervals in the circumferential direction so that the protrusions 130 of the funnel holding plate 128 pass through the cut-outs 134.

Accordingly, the funnel 132 can be inserted into the circumferential edge portion of the funnel holding plate 128 by positioning the cut-outs 134 in the outer circumference of the opening so that these cut-outs do not coincide with the protrusions 130 on the inside surface of the circumferential edge portion of the funnel holding plate 128. When the coffee funnel 132 is rotated by an appropriate angle in the circumferential direction in this state, the outer circumferential edge of the coffee funnel 132 is anchored on the protrusions 130 of the funnel holding plate 128. A plurality of agitating rods 136 are formed on the undersurface of the coffee funnel 132.

The reference numeral 138 indicates a coffee cooling device. In this coffee cooling device, an iced coffee tank 140 set inside and an ice water tank 142 set outside are integrated in a coaxial configuration. In other words, the tanks 140 and 142 have the form of coaxial cylinders that have a bottom. A coffee discharge valve 144 is provided in the center of the bottom of the coffee cooling device 138.

The coffee cooling device 138 is carried on a partition wall 108. A slit 146 is formed in the partition wall 108 so that the discharge valve 144 passes through the slit 146, and the coffee cooling device 138 is set on the partition wall 108 with the discharge valve 144 passing through the slit 146. In this structure, as seen from FIG. 6, the coffee funnel 132 is placed on the coffee cooling device 138 so that the agitating rods 136 are inside the ice water tank 142, and the coffee cooling device 138 and the coffee funnel 132 are mounted on the partition wall 108 in a combined state.

Next, the outer circumferential edge of the coffee funnel 132 is engaged with the protrusions 130 of the funnel holding plate 128 by adjusting the rotational angle of the coffee funnel 132 while pushing the coffee cooling device 138 upward as shown by the arrow in FIG. 6, so that the coffee funnel 132 is attached to the funnel holding plate 128. If the coffee cooling device 138 is lowered in this state, the coffee funnel 132 is separated from the coffee cooling device 138, so that the coffee cooling device 138 alone is lowered and placed on the partition wall 108. In other words, the state shown in FIG. 5 is obtained.

In FIGS. 5 and 6, the reference numeral 148 is a jug; and this jug 148 is carried on the heater 114 with an adiabatic plate 150 interposed during iced coffee extraction. During hot coffee extraction, the adiabatic plate 150 is removed, so that the temperature of the jug 148 is maintained by the heater 114. The jug 148 during hot coffee extraction is lowered as shown by imaginary line in FIG. 5.

Numerous small holes are formed in the cover 152 of the jug 148 near the center of the cover 152. The central portion of this cover 152 curves smoothly in a sinking (protruding) configuration, so that the cover 152 can be mounted even when turned inside out. During the extraction of iced coffee, the cover 152 is provided so that the center of the cover sinks as shown by the solid line in FIG. 5, and the discharge valve 144 of the coffee cooling device 138 is closed without contacting the cover 152. When the jug 148 is lifted in this state, the recessed portion of the cover 152 pushes the discharge valve 144 upward and opens this valve. As a result, the iced coffee inside the iced coffee tank 140 can flow downward into the jug 148.

During the extraction of hot coffee, on the other hand, the he jug 148 is lowered, and the cover 152 is turned inside out as indicated by the imaginary line in FIG. 5. As a result, the central portion of the cover 152 protrudes upward and pushes the discharge valve 144 upward so that the valve is opened. Accordingly, in this case, hot coffee flows directly downward into the jug 148 from the iced coffee tank 140. It goes without saying that no ice water is placed in the ice water tank 142 during this hot coffee extraction.

In this embodiment, while ice water is placed in the ice water tank 142 during the extraction of iced coffee, the ice water is rotated by the driving means formed by the motor 116, pulleys 118 and 122, belt 120, funnel holding plate 128, coffee funnel 132 and agitating rods 136, etc. Accordingly, the iced coffee tank 140 that is immersed in the ice water can efficiently cool the coffee that is in the iced coffee tank 140.

When the jug 148 is set in the bottom section 104, the cover 152 automatically opens the discharge valve 144, so that the coffee that has collected and cooled in the iced coffee tank 140 flows downward into the jug 148.

During hot coffee extraction, no ice water is placed in the ice water tank 142; and the cover 152 of the jug 148 is turned inside out, and the jug 148 is set in the bottom section 104 with the adiabatic plate 150 removed. When the jug 148 is thus set, since the cover 152 opens the discharge valve 144, hot coffee that has dropped into the iced coffee tank 140 from the coffee funnel 132 passes straight through the iced coffee tank 140 and flows downward into the jug 148.

When the extraction of coffee is completed, the cooling device 138 is lifted and rotated slightly together with the coffee funnel 132, the coffee funnel 132 is removed from the funnel holding plate 128, and the cooling device 138 and coffee funnel 132 are pulled out together to the side of the main body.

The invention claimed is:

1. A coffeemaker that heats water in a water tank by a heater, conducts heated water into a coffee funnel that accommodates ground coffee, and collects liquid coffee that drips from the coffee funnel, the coffeemaker comprising:
   an iced coffee tank that collects liquid coffee dripping from the coffee funnel,
   an ice water tank that accommodates ice water which cools the liquid coffee inside the iced coffee tank via wall of the iced coffee tank, and
   a driving means for causing relative rotation of the ice water inside the ice water tank about said iced coffee tank.

2. The coffeemaker according to claim 1, wherein an upper part of the iced coffee tank is held by a main body of the coffeemaker, and the ice water tank is rotated by the driving means.

3. The coffeemaker according to claim 1, wherein the iced coffee tank and the ice water tank are provided coaxially and are capable of making a relative rotation, and wherein the iced coffee tank is provided inside the ice water tank and has a liquid coffee discharge valve at a lower end thereof.

4. The coffeemaker according to claim 1, wherein a main body of the coffeemaker has upper, middle and lower accommodating sections, and the coffee funnel is selectively accommodated in either one of the upper accommodating section and middle accommodating section.

5. The coffeemaker according to claim 4, wherein the coffee funnel is accommodated in the upper accommodating section, a coffee cooling device that is comprised of the iced coffee tank and ice water tank in an integral unit is accommodated in the middle accommodating section, and a jug is accommodated in the lower accommodating section, thus allowing the liquid coffee to flow into the jug when the liquid coffee discharge valve of the iced coffee tank is opened.

6. The coffeemaker according to claim 5, wherein the liquid coffee discharge valve of the iced coffee tank is opened in linkage with an operation of setting of the jug in the lower accommodating section.

7. The coffeemaker according to claim 4, wherein the coffee funnel is accommodated in the middle accommodating section, the jug is accommodated in the lower accommodating section, and a scatter that disperses heated water and conducts the heated water into the coffee funnel is accommodated in the upper accommodating section, thus allowing hot coffee to be extracted.

8. The coffeemaker according to claim 1, further comprising a first water tank and a second water tank, the first water tank being used to extract hot coffee, the second water tank being used to extract iced coffee, and a volume of the second water tank being set to be substantially the same as a volume of the iced coffee tank.

9. The coffeemaker according to claim 8, wherein an internal diameter of a second pipe that conducts water in the second water tank to the heater is set to be smaller than an internal diameter of a first pipe that conducts water in the first water tank to the heater.

10. The coffeemaker according to claim 7, wherein the driving means comprises a first driving body that faces an interior of the middle accommodating section, a second driving body that faces an interior of the upper accommodating section, and a motor that rotationally drives the first and second driving bodies; and
   the first driving body rotates the scatter that is accommodated in the upper accommodating section when hot coffee is extracted, and
   the second driving body rotates the ice water tank that is accommodated in the middle accommodating section when iced coffee is extracted.

11. The coffeemaker according to claim 1, wherein
   the iced coffee tank and the ice water tank are formed in the shape of coaxial cylinders having bottoms and are held in a main body of the coffeemaker, and
   the driving means is provided with an agitating member that extends into the ice water tank from above and a motor that causes the agitating member to rate inside the ice water tank.

12. The coffeemaker according to claim 11, wherein the coffee funnel is provided so as to be rotated about a vertical axis thereof and is rotated by the motor, and the agitating member is provided on the coffee funnel so as to be rotated together with the coffee funnel.

13. The coffeemaker according to claim 12, further comprising a funnel holding plate provided above the coffee funnel and rotated by the motor, and the coffee funnel is detachable mounted on the funnel holding plate from below in a state in which the coffee funnel is carried on a coffee cooling device that is comprised of the iced coffee tank and the ice water tank.

* * * * *